(12) United States Patent
Lutgen

(10) Patent No.: US 12,743,680 B2
(45) Date of Patent: Sep. 22, 2026

(54) METHOD AND CONTROL DEVICE FOR SECURELY CHECKING AN ELECTRONIC TICKET

(71) Applicant: VDV eTicket Service GmbH & Co. KG, Cologne (DE)

(72) Inventor: Joseph Lutgen, Cologne (DE)

(73) Assignee: VDV eTicket Service GmbH & Co. KG, Cologne (DE)

( * ) Notice: Subject to any disclaimer, the term of this patent is extended or adjusted under 35 U.S.C. 154(b) by 751 days.

(21) Appl. No.: 17/615,218

(22) PCT Filed: May 29, 2020

(86) PCT No.: PCT/EP2020/064974
§ 371 (c)(1),
(2) Date: Nov. 30, 2021

(87) PCT Pub. No.: WO2020/245043
PCT Pub. Date: Dec. 10, 2020

(65) Prior Publication Data

US 2022/0230146 A1 Jul. 21, 2022

(30) Foreign Application Priority Data

Jun. 3, 2019 (DE) ..................... 10 2019 114 844.8

(51) Int. Cl.
*G06Q 20/04* (2012.01)
*G06Q 10/02* (2012.01)
(Continued)

(52) U.S. Cl.
CPC ......... *G06Q 20/0457* (2013.01); *G06Q 10/02* (2013.01); *H04L 9/0825* (2013.01);
(Continued)

(58) Field of Classification Search
CPC ............... H04L 9/0825; H04L 2209/56; H04L 2209/80; G06Q 20/0457; G06Q 10/02;
(Continued)

(56) References Cited

U.S. PATENT DOCUMENTS 7,392,226 B1 * 6/2008 Sasaki ................. G07F 17/0014 705/64
9,306,753 B1 * 4/2016 Vandervort ........... H04L 9/3234
(Continued)

FOREIGN PATENT DOCUMENTS

DE 102010017861 A1 10/2011
EP 1750220 A1 2/2007

*Primary Examiner* — Daniel I Walsh
(74) *Attorney, Agent, or Firm* — The Webb Law Firm

(57) ABSTRACT

A method for a secure check of an electronic ticket, in which the electronic ticket is stored on a first mobile terminal device allocated to an end consumer, and the ticket is checked using a second terminal device allocated to a ticket inspector or to a control system, wherein the method the following steps:

sending a request message from the second terminal device to the first terminal device via a first communication channel;

sending a response message from the first terminal device to the second terminal device via a second communication channel, the response message being signed by the first terminal device, and the second communication channel;

verifying the signed response message by the second terminal device; and confirming the authenticity of the response message by the second terminal device, if the second terminal device was previously able to verify the authenticity of the signature.

15 Claims, 6 Drawing Sheets

(51) Int. Cl.
*H04L 9/08* (2006.01)
*G06Q 50/40* (2024.01)

(52) U.S. Cl.
CPC ......... *G06Q 50/40* (2024.01); *G06Q 2220/00* (2013.01); *H04L 2209/56* (2013.01); *H04L 2209/80* (2013.01)

(58) Field of Classification Search
CPC .......... G06Q 2220/00; G06Q 20/4097; H04W 12/06; G07B 11/00
See application file for complete search history.

(56) References Cited

U.S. PATENT DOCUMENTS 9,978,023 B2 * 5/2018 Levin ................... G06K 7/1417
10,366,373 B1 * 7/2019 Denker ................ G06Q 20/047
11,019,520 B2 * 5/2021 Kim ........................ H04W 4/46
2002/0094090 A1 * 7/2002 Iino ................... G11B 20/00811 380/282
2002/0111214 A1 * 8/2002 Lind ....................... G07F 17/32 463/42
2002/0166056 A1 * 11/2002 Johnson ........... G11B 20/00181 713/193
2004/0039919 A1 * 2/2004 Takayama .............. G06Q 20/24 713/180
2006/0085359 A1 * 4/2006 Kim ................. G06Q 20/38215 705/65
2008/0195762 A1 * 8/2008 Wood .................... G06F 3/0231 710/1
2009/0125429 A1 * 5/2009 Takayama ............ G06Q 20/327 705/35
2010/0017501 A1 * 1/2010 Yen ....................... G06F 21/128 709/219
2010/0257111 A1 * 10/2010 Veugen ................ G06Q 20/045 705/318
2012/0122585 A1 * 5/2012 Nguyen .............. G07F 17/3223 463/42
2012/0191974 A1 * 7/2012 Suzuki ............... H04N 21/4405 713/168
2014/0281576 A1 * 9/2014 Suzuki ................ G06F 21/6209 713/189
2015/0081346 A1 * 3/2015 Charles .................. G06Q 10/02 705/5
2015/0120536 A1 * 4/2015 Talker .................. G06Q 20/367 705/39
2015/0339599 A1 * 11/2015 Lee .................... G06Q 20/3227 705/5
2015/0339886 A1 * 11/2015 Pinkus ................ G07F 17/3251 463/25
2016/0309327 A1 * 10/2016 Grimault ............. H04W 12/068
2016/0344705 A1 * 11/2016 Stumpf ................. H04L 9/3213
2016/0364659 A1 * 12/2016 Bergdale ................ G06Q 10/02
2017/0154284 A1 * 6/2017 Borucki .................. H04W 4/02
2017/0220960 A1 * 8/2017 Micah ................ G06Q 20/3827
2017/0286873 A1 * 10/2017 Grimault ............ G06Q 20/3229
2018/0082220 A1 * 3/2018 Bombacino ............ G06Q 10/02
2018/0130118 A1 * 5/2018 Guran ................ G06Q 30/0635
2019/0018719 A1 * 1/2019 Brin ......................... G06F 9/547
2019/0026981 A1 * 1/2019 Petersen ............. G07F 17/3225
2019/0251757 A1 * 8/2019 Aczel ................... G06Q 20/047
2019/0378185 A1 * 12/2019 Ito .......................... G06Q 10/00
2020/0012801 A1 * 1/2020 Porteret ................ H04W 12/68
2020/0184430 A1 * 6/2020 Umemoto .............. G06Q 10/02
2021/0073529 A1 * 3/2021 Thompson ............. G06V 20/56
2021/0224823 A1 * 7/2021 Oomori .................. G06Q 10/02
2022/0122072 A1 * 4/2022 Kang ................. G06Q 20/4014
2022/0230146 A1 * 7/2022 Lutgen ................. G06Q 20/327
2024/0005432 A1 * 1/2024 Aman .................... G06Q 50/22
2025/0095439 A1 * 3/2025 Jones .................. G07F 17/3227

* cited by examiner

METHOD AND CONTROL DEVICE FOR SECURELY CHECKING AN ELECTRONIC TICKET

CROSS-REFERENCE TO RELATED APPLICATIONS

This application is the United States national phase of International Application No. PCT/EP2020/064974 filed May 29, 2020, and claims priority to German Patent Application No. 10 2019 114 844.8 filed Jun. 3, 2019, the disclosures of which are hereby incorporated by reference in their entirety.

BACKGROUND OF THE DISCLOSURE

The present disclosure relates to a method for securely checking an electronic ticket and a corresponding control device for a secure checking.

DESCRIPTION OF RELATED ART

An ever-increasing number of consumers decides to purchase in particular bus and train tickets, but also tickets for concerts and other events, online. When purchasing online, a consumer usually has the option to have the purchased ticket sent to him by mail or e-mail. As an alternative, he often also has the option to have the ticket transferred directly to his smartphone.

The two variants in which the ticket is sent by e-mail or is transferred directly to the smartphone of a consumer, are generally referred to as e-tickets.

If the consumer opts for a delivery by e-mail, the ticket is often delivered in PDF format. In this case, the ticket data are generally stored as a barcode so that they can be read easily and quickly by a control device. Possibly, the ticket data are also represented in plain text.

If the consumer opts for a direct transfer of the ticket to his smartphone, the ticket data are loaded directly into his smartphone via a corresponding app. This variant is particularly popular for railway tickets. For example, Deutsche Bahn AG offers a corresponding app (also known as DB Navigator) in which the electronic tickets of a passenger can be stored.

According to current prior art, as soon as an electronic ticket is to be checked, the data, which are often stored as a 2D barcode (often as an Aztec code), are read out by a ticket inspector's control device. The ticket inspector quickly receives all relevant information about the electronic ticket, such as the name of the passenger, the booked route, the booked means of transport (e.g. regional express or ICE), the booked class ($1^{st}$ or $2^{nd}$ class), the booked seat, if applicable, BahnCard options, etc.

Thus, the ticket inspector can quickly check whether a passenger has booked the "right" ticket and thus has a presumed entitlement to use the selected means of transport.

However, according to the above described method, the ticket inspector can check only to a limited extent whether the ticket is an original or a forgery or a copy, and whether the passenger is actually entitled to use the selected means of transport.

Therefore, there is presently a variety of approaches to design tickets forgery-proof. To increase security, present electronic tickets often include additional parity bits which are formed from the ticket data by means of an algorithm. Should a fraudster try to manipulate the electronic ticket data, e.g. by changing the information about the booked route, the ticket inspector or his control device can detect the manipulation of the ticket data.

While the above described mechanism protects against unauthorized manipulation of the ticket data, it does not prevent a fraudster from copying the entire electronic ticket. To this end, he could, for example, copy the barcode associated with an electronic ticket by means of a screenshot and transfer this screenshot to one or more other smartphones. To prevent this problem, most electronic tickets today are personalized. Thus, in addition to checking the electronic ticket, the ticket inspector can also check the personal data of the passenger and ask the passenger to identify himself. If the indicated name of the passenger is identical with the name stored in the electronic ticket, the passenger is considered to be entitled. While the above described method for checking electronic tickets in combination with checking the personal data can be considered relatively secure, the described two-stage checking method (checking the ticket data and the personal data) is rather time-consuming in practice and is very unpopular both with users and ticket inspectors. In addition, in some cases, the two-stage checking method is practically impossible to perform at all, if, for example, a user claims not to carry an ID card with him.

Although the electronic ticket can be read out automatically within a few seconds, the additional manual check of a passenger's ID card or passport is relatively cumbersome. The passenger often only has his electronic ticket at hand, but not his identification documents. As a result, checking the personal data of a single passenger may take 1 minute or even longer. With several 100 passengers whose tickets are to be checked, this results in a significant effort.

As a consequence, a railway operator would have to hire additional inspection personnel to ensure a complete and thorough check of all passenger entitlements. As an alternative, he can forego the additional inspection personnel and thus accepts a merely superficial check of the passenger entitlements, e.g. by partially of completely foregoing the check of personal data.

In practice, this results in the fact that often only the electronic tickets are checked, and the personal data of a passenger are not checked as well. However, this approach is unsatisfactory since it does not provide the operator with sufficient security against fraudsters.

SUMMARY OF THE DISCLOSURE

Based on the above described problem, it is an object of the present disclosure to provide a method and a control device for a secure check of an electronic ticket, in particular an electronic bus and/or railway ticket. It is an additional object of the present disclosure that the method for a secure check is designed efficiently.

To achieve this object, a method for a secure check of an electronic ticket is proposed, in which the electronic ticket is stored on a first mobile terminal device allocated to an end consumer, and the ticket is checked using a second terminal device allocated to a ticket inspector or to a control system. The method according to the disclosure comprises the following steps:

- sending a request message from the second terminal device to the first terminal device via a first communication channel;
- sending a response message from the first terminal device to the second terminal device via a second communication channel, the response message being signed by the first terminal device, and the second communication channel either being identical with the first communication channel or different from the first communication channel;

verifying the signed response message by the second terminal device; and confirming the authenticity of the response message by the second terminal device, if the second terminal device was previously able to verify the authenticity of the signature.

The method of the present disclosure and in particular the signature of the response message by the first terminal device provide an additional protective mechanism for an efficient protection against fraudsters. The first terminal device on which the electronic ticket is located is requested by the second terminal device to send a response message. This response message is signed by the first terminal device. The digital signature which is attached to the response message can thereafter be checked by the second terminal device. In generating the digital signature, a private key of the first terminal device is used. The subsequent check by the second terminal device is performed using a public key of the first terminal device. The public key and the private key of the first terminal device together form a key pair and are mathematically coupled with each other. Key pairs are generally known from cryptography and are used in asymmetric encryption methods. Such a key pair may be generated, for example, by using a standard method of elliptic curve cryptography or by using the RSA method.

For example, the public key may also be included in the response message. As an alternative, it may also be provided that the public key of the first terminal device is stored in the second terminal device or on a storage medium which can be accessed by the second terminal device via a network link. Since the second terminal device holds the public key of the first terminal device or has access to the public key, the second terminal device van check, whether the signature of the first terminal device is valid or not. If the signature is invalid, the second terminal device can conclude therefrom that it is a forgery or a copy of the electronic ticket.

According to one embodiment of the method according to the disclosure, the second terminal device may be configured as a mobile terminal device. This is advantageous in particular if the method according to the disclosure is to be implemented in trains. As an alternative, it may also be provided that the second terminal device is designed as a stationary terminal device. This may be desired in particular if the method according to the disclosure is to be implemented in the context of an access control system or an access system. Such an access control system may include, for example, electronically controlled access barriers or automatically opening access doors and perform an automatic check on the electronic tickets or a passenger's entitlement to use a means of transport.

The first terminal device according to the method of the disclosure may preferably be designed as a smartphone. The second terminal device may also be designed as a smartphone.

In addition to the control mechanism provided by the transmission of the request message to the first terminal device and the transmission of the signed response message to the second terminal device, it is also possible to preferably also transmit the ticket data to the second terminal device. Several alternatives exist for the transmission of the ticket data. For example, it may be provided that first the ticket data stored in a 2D barcode are displayed on a display of the first terminal device. The second terminal device may then read out the 2D barcode and check the ticket data (in particular the route, the booked class etc.). In this context, this may be referred to as a transmission of the ticket data via an optical communication channel. Thereafter, for checking the identity of the passenger, the second terminal device may transmit a request message to the first terminal device and request an acknowledgment by means of a signed response message.

According to another embodiment of the method according to the disclosure, it may be provided that the ticket data are transmitted in the response message. Thus, the entire control or communication between the control device (second terminal device) and the terminal device of the consumer (first terminal device) is performed in a total of two steps (sending the request message to the first terminal device and sending the response message containing the ticket data to the second terminal device). In this case, the ticket data may be stored, for example, as a 2D barcode or in any other format (e.g. in text format).

Further, according to an embodiment of the method according to the disclosure, it may be provided that the request message includes a verification message. The verification message may, for example, be a character string (in particular a randomly generated text or a randomly generated number) generated according to a random algorithm or a pseudo-random algorithm, which string has been generated by the second terminal device before. Specifically, it may be provided that, after receiving the request message including the verification message, the first terminal device encrypt this verification message using the private key and then transmits an encrypted representation of the verification message to the second terminal device. This transmission is then effected through the response message. Thereafter, the second terminal device can decrypt the encrypted verification message using the public key of the first terminal device and thereby check, whether the first terminal device actually holds the key associated thereto. In this manner, the security of the checking method according to the disclosure can be increased further, since it is excluded that the response message is generated already before the verification message is generated. The verification message generated by the second terminal device may in particular be different in each control process. Thereby, it is practically impossible for a fraudster to copy a response message available to him or to reconstruct a response message, which would be detected by the second terminal device as a valid response message, from a response message known to him.

According to another embodiment of the method of the present embodiment, it may be provided that the request message comprises a verification message including a random number of the length L, generated by the second terminal device, where L>=1, and the response message includes a representation of the random number generated by the second terminal device, encrypted using a private key of the first terminal device. For example, it may be provided that the random number has a length of 64 bits. According to one embodiment of the method of the present disclosure, it may further be provided that the random number is 128 bits long. By using a particularly long random number it becomes particularly difficult to forge or copy the electronic ticket. According to this embodiment, the first terminal device can in particular not use a copy of a response message previously generated by another terminal device, but must itself generate the response message that includes the encrypted representation of the random number. Otherwise, the second terminal device would determine that the first terminal device is in possession of an allegedly correct private key, but has encrypted another number than the random number previously generated by the second terminal device.

According to another advantageous embodiment of the method of the present disclosure, it may also be provided that the response message includes a digital certificate that originates from the service provider that has issued the electronic ticket or from an entity classified as trustworthy by the service provider (trust anchor). The digital certificate may in particular be designed as a public key certificate. Here, the digital certificate may include a public key which forms a key pair together with a private key of the service provider. Basically, it is possible that the public key is included in the response message and is transmitted to the second terminal device, that the public key is stored on a server or that the public key is stored on the control device. The trust anchor (hereinafter also referred to as an entity classified as trustworthy by the service provider) determines, whether the first mobile terminal device is suitable as a host for the trustworthy client application. If this is the case, it provides the mobile terminal device with a unique ID, a key and a certificate or a verification code. The verification code can be checked easily and offline by all authorized participants in the system and confirms the trustworthiness of the client application.

The digital certificate may in particular include information about the issuer of the certificate and the certificate recipient. The digital certificate may also include information about the hash function used. For example, it may be stored in the digital certificate that the first terminal device uses SHA-1 or SHA-256 as the hash function.

The second terminal device can use the data included in the digital certificate to check whether the owner of the first terminal device is actually entitled to use the electronic ticket. The digital certificate may further be signed using a private key of the service provider. The public key of the service provider associated with the private key may be stored on the second terminal device or on a memory accessible via a network link. Thereby, the second terminal device can verify whether the certificate was actually issued by the service provider. In addition, the digital certificate may include information regarding the validity period of the certificate. For example, the digital certificate may include the date on which the certificate was issued, as well as a validity period (e.g. 3 months). The second terminal device can thus check whether the certificate is still valid at the time the electronic ticket is checked. If the certificate is no longer valid, the second terminal device can conclude that the owner of the first terminal device is not entitled to use the ticket stored on the first terminal device.

It may further be provided that, in the method according to the present disclosure,

- the response message comprises the electronic ticket which, besides the ticket information, also comprises a first digital identifier of the first terminal device, and that the electronic ticket comprises a digital signature of the service provider;
- in addition to the electronic ticket, the response message comprises a second digital identifier of the first terminal device generated by the first terminal device; and
- the second terminal device confirms the authenticity of the response message only if the first identifier contained in the electronic ticket and the second identifier generated by the first terminal device are identical.

For the identifiers (ID), a digital fingerprint of the first terminal device may be used in particular. Specifically, a hardware fingerprint or a software fingerprint of the first terminal device can be used. A digital fingerprint enables an unambiguous identification of a terminal device. A hardware fingerprint may, for example, comprise a processor ID, a memory ID and/or a graphics chip ID. Furthermore, the digital fingerprint may be composed of the above-mentioned IDs or be calculated therefrom. In this embodiment of the method of the present disclosure, it may be provided in particular that upon registration of the end consumer with the service provider or upon purchasing the electronic ticket, the ID of the first terminal device is queried or read out. To this end, for example, an application may be provided on the first terminal device (trustworthy client application) which reads out or generates this ID. For this purpose, for example, a hardware ID (e.g. the CPU serial number or the memory serial number) can be read out and be forwarded to the service provider so that the electronic ticket is thereafter generated by the service provider in a personalized manner, and the ticket contains the data of the purchaser and/or the ID of the first terminal device (first identifier). In this manner, the ticket is coupled with the terminal device of the purchaser. The trustworthy client application protects the private key and data of the application on mobile terminal devices and is verified and authorized by the trust anchor for this purpose. Since the electronic ticket is also signed in particular by the service provider, an unauthorized person not in possession of the private key of the service provider can not manipulate the data of the electronic ticket. Thus, upon checking, the second terminal device can verify whether the checked ticket was actually generated for the first mobile terminal device of the passenger, or whether the ticket was generated for another terminal device and was subsequently copied to the first terminal device now checked. Upon checking the electronic ticket, the identifier of the first terminal device is queried in addition to the data contained in the electronic ticket. For example, the second terminal device may read out a hardware ID if the first terminal device (second identifier). Thereafter, the second terminal device can compare the first identifier and the second identifier. Only if the two identifiers are identical will the authenticity of the response message be confirmed. In this manner, a particularly secure verification process can be provided. With the key and the signing function thus established in the trustworthy client application, a ticket issuing system or a control device can itself determine the trustworthiness thereof, as well as the authenticity of the unambiguous ID. The ticket issuing system inserts this ID into the data of a ticket to be issued, before it signs these data and returns these to the client application. Thus, the ticket is bound to this ID.

According to a further embodiment of the method according to the present disclosure, it may be provided that the identifier of the first terminal device is used independently of the above-described principle of the request message and the response message. In other words, to achieve the above-mentioned object, a method for a secure check of an electronic ticket is proposed, wherein the electronic ticket is stored on a first mobile terminal device associated with an end consumer, and the ticket is checked by a second terminal device associated with a ticket inspector or a control system. The method according to the present disclosure comprises the following steps:

- sending a verification message from the first terminal device to the second terminal device via a communication channel, the verification message comprising the electronic ticket which, besides the ticket information also comprises a first digital identifier of the first terminal device, and the electronic ticket comprising a digital signature of the service provider;

the verification message comprising, in addition to the electronic ticket, a second digital identifier of the first terminal device generated by the first terminal device; and the second terminal device confirming the authenticity of the verification message only if the first identifier contained in the electronic ticket and the second identifier generated by the first terminal device are identical.

It is an advantage of this embodiment that the security of the method of the present disclosure is further increased, since it is almost excluded that the electronic ticket, which preferably contains a signature of the service provider, is manipulated. Moreover, it is almost excluded that the identifier of the first terminal device, which may in particular be a hardware ID, is manipulated. Here, the identifier of the first terminal device is generated preferably by an application provided by the service provider. Therefore, it is particularly difficult to manipulate this application in order to transmit a forged identifier.

As an alternative, it may be provided that the second terminal device confirms the authenticity of the verification message only if the identifier contained in the electronic ticket and the identifier stored in the digital certificate are identical. Thereby, a particularly secure method is provided, since both the manipulation of the electronic ticket and the manipulation of the digital certificate are virtually impossible.

According to one embodiment of the present disclosure, the method of the present disclosure comprises the following steps:

sending a verification message from the first terminal device to the second terminal device via a communication channel, the verification message comprising the electronic ticket which, besides the ticket information also comprises a digital identifier of the first terminal device, and the electronic ticket comprising a digital signature of the service provider;

the verification message comprising, in addition to the electronic ticket, a digital certificate signed by the service provider and containing the digital identifier of the first terminal device; and the second terminal device confirming the authenticity of the verification message only if the identifier contained in the electronic ticket and the identifier contained in the digital certificate are identical.

Further, in an alternative embodiment of the present disclosure, it may be provided that the second terminal device confirms the authenticity of the verification message only if the identifier stored in the digital certificate and the identifier generated by the first terminal device are identical. This ensures a particularly high level of security since it is virtually impossible to manipulate the identifier store in the digital certificate and the identifier of the first terminal device.

Overall, basically three different options are possible for checking the identifiers (comparing the ID stored in the ticket with the ID stored in the digital certificate, comparing the ID stored in the ticket with the ID read out by the first terminal device, and comparing the ID stored in the digital certificate with the ID read out by the first terminal device), with each variant having the advantages mentioned above.

Furthermore, it may be provided in the method according to the present disclosure that the response message comprises a time stamp and that the authenticity of the response message is confirmed by the control device (second terminal device) only if the age of the time stamp is below a predetermined threshold value. For example, it may be provided that the authenticity of the response message is not confirmed if the time stamp is older than 60 seconds. This can additionally prevent a response message generated by a terminal device from being transferred onto an unauthorized first terminal device and duplicated. In this case, a generated response message is valid only for 60 seconds and can no longer be used beyond this period. This can further increase the level of security of the method of the present disclosure.

According to one embodiment of the method of the present disclosure, it may be provided that the time stamp is integrated in a barcode, specifically a 2D barcode. For example, the second terminal device can send a request message to the first terminal device, and the first terminal device can generate a response message in response to the request message, which response message transmits the relevant information encoded in a barcode. The second terminal device can read out the barcode and check whether it actually is a recently generated barcode, or whether the same was generated, for example, 1 or 2 hours ago and was possibly transferred onto the checked device at a later time. In this case, the ticket inspector could ask the passenger to identify himself.

It may also be provided that the response message contains a digital certificate in which a security indicator is stored which characterizes the fulfillment of predetermined security requirements by the first terminal device. The security indicator may contain information regarding the result of a previous security check of the first terminal device. Specifically, it may be provided that, when the first terminal device is registered with the service provider (ticket server) or with an entity classified by the service provider as being trustworthy (trust anchor), a security check of the first terminal device is performed during which it is checked, whether the security requirements predefined by the service provider are fulfilled by the terminal device. For example, it can be checked during the security check, whether the first terminal device has an up-to-date version of the operating system and/or whether an antivirus software is installed on the first terminal device. If the first terminal device has an outdated operating system or does not have an antivirus software, the security attribute can contain corresponding information which characterize the first terminal device as insecure. Furthermore, it can be checked during the security check, whether the first terminal device is a routed smartphone or a routed tablet. If, upon checking, it is determined that the terminal device is routed, the security attribute may contain corresponding information classifying the first terminal device as insecure. Here, the security check may be performed either in a standardized manner or individually and in dependence on the detected terminal device. For example, it may be provided that the security requirements for terminal devices with an Android operating system differ from the security requirements for terminal devices with an IOS operating system. In this way, an individualized check of the terminal devices is possible, without performing any superfluous checking steps. By providing the security indicator, individual services can be controlled in dependence on the individual terminal devices. For example, it may be provided that the terminal devices that fulfill the security requirements of the service provider are entitled to by tickets, whereas the terminal devices which do not fulfill the security requirements are not entitled to buy tickets. For example, it can be provided that the terminal devices that do not meet the security requirements can merely retrieve information about the connections. It may also be provided that the second terminal device refuses to verify the checked ticket should the first terminal device not correspond to the predetermined security requirements. The digital certificate containing the security indicator can, for example be contained in the electronic ticket or, as an alternative, be an element designed separately from the electronic ticket.

According to one embodiment of the disclosure, it may be provided that the security indicator is implemented as a binary security flag, which has a value of 1, if a previous security check of the first terminal device has shown that the first terminal device fulfills the predetermined security requirements; and has a value of 0, if the previous security check of the first terminal device has shown that the first terminal device does not fulfill the predetermined security requirements.

In this way, the results of a previous security check of the first terminal device can be encoded in a single bit. Thereby, the amount of data transmitted in the context of the method of the disclosure is limited.

Furthermore, in the method of the present disclosure, it may be provided that the first terminal device and the second terminal device each comprise a near field communication module (NFC module), and that the first communication channel is based on near field communication (NFC). Transmitting the request message via an NFC communication channel has the advantage that the request message cannot be read by a third party, since the date are transmitted only over a very short distance (typically a few centimeters). Therefore, it is virtually impossible for a third party to read out the request message, which can contain e.g. a generated random number as a verification message, and to generate a response message on the basis of this verification message, which response message could thereafter be transferred onto the first terminal device checked by a ticket inspector.

In addition, it may be provided that the first communication channel is based on a Bluetooth transmission standard. This has the advantage that the checking process can be performed over longer distances (several meters). For example, it can be provided that a control device simultaneously transmits a plurality of request message to different smartphones in the vicinity, and thereby a plurality of terminal devices or passengers is checked. The time required for checking tickets can be reduced significantly in this manner. Another advantage of using the Bluetooth transmission standard is that not all smartphones available on the market comprise an NFC module. As such, in particular older models have no NFC module or at least no freely usable NFC module, while they mostly have a Bluetooth module.

Moreover, it may be provided that the first communication channel is designed as an optical communication channel. Here, it may be provided in particular that the communication between the first terminal device and the second terminal device is performed using barcodes, in particular 2D barcodes, which are displayed on the display of a terminal device and can be read out by a camera or an optical scanner of the other terminal device.

According to another embodiment of the method of the disclosure, it may be provided that both the first terminal device and the second terminal device comprise a front camera. In other word, both terminal devices have a camera which is arranged on the same side of either terminal device, on which also the displays of the terminal devices are arranged. In this way, it may be provided that for verifying the ticket data, both terminal devices are aligned frontally so that the request message can be transmitted from the second terminal device to the first terminal device and the response message can be transmitted from the first terminal device to the second terminal device. Here, the corresponding data are displayed on the display of either terminal device (in encoded or uncoded form) and are read out via the camera of the other terminal device.

According to another embodiment of the method of the present disclosure, it may further be provided that the NFC module of the second terminal device emulates an NFC tag. In other words, the control device pretends to be an NFC tag. This has the advantage that even smartphones which are unable to communicate via the standard NFC interface, but merely to read out NFC tags, can be used in the method of the present disclosure. This is the case in particular with some models of the smartphone manufacturer Apple. As the NFC interface is open only to a limited extent in some iPhone models, these models are not per se suitable to communicate with a control device via an NFC interface. If, however, the second terminal device emulates an NFC tag, this enables communication also with the models mentioned. This advantageously provides a method suitable for cross-platform use.

According to another embodiment of the method of the present disclosure, it may be provided that the response message contains biometrical data of the consumer, in particular data relating to a fingerprint, a voice, features of a face or a pattern of an iris. This has the advantage that, in addition, the identity of the user can be verified by a comparison of the biometrical data. The verification is performed by the second terminal device by comparing the biometrical data received from the first terminal device with data from a database or directly with the features of the user which are stored on the second terminal device or also in a memory element accessible via a Network link. For example, the data base can contain the fingerprint of a user registered before, as well as the full name and/or the ID card number. Similarly, for example, the voice of a user registered before and the name or address can be stored in the database. In this manner, the second terminal device can verify the identity of the checked person by checking the biometrical data.

Furthermore, it may be provided that the response message contains a photographic image of the consumer or a photographic image of a user's face. This has the advantage that the second terminal device can then verify the photographic image of the consumer received from the first terminal device. According to one embodiment of the method of the present disclosure, it may be provided that the photographic image is first converted into a "real life emoji image" and that thereafter only said emoji image of the user is transmitted to the control device. In other words, an image of the user with a reduced amount of data is generated and transmitted to the control device. The amount of data of the emoji image is very much reduced when compared with the original photographic image. Thus, the transmission of the response message can advantageously be performed within a very short time. Nevertheless, the "real life emoji image" still provides the ticket inspector with a sufficiently high level of identifiability for use in public transportation. Thus, hen checking an electronic ticket, the ticket inspector can also directly check, whether the first terminal device actually belongs to the person in possession of the terminal device. Therefore, the ticket data and the photographic image of the consumer can simultaneously be displayed on the second terminal device, so that the ticket inspector can quickly perform the check.

According to another embodiment of the method of the present disclosure, it may also be provided that the second terminal device comprises a memory element and/or is connected to an external memory element on which a list of identification data is stored for which the probability of a lack in authenticity exceeds a predetermined probability threshold, The identification data may in particular comprise a ticket number or an identifier of a first terminal device. Thereby, the risk of individual fraudsters copying tickets can be reduced further. For example, it may be provided that upon every check, the identification data, e.g. a hardware fingerprint of the terminal device checked, are stored. Thereafter, it may be stored in a database how often these identification data have been registered during previous checks. If the identification data of a specific terminal device are registered particularly often, this may be an indication that these tickets are copied and circulate in numbers. For example, it may be provided that in cases in which the same identification data are registered by control devices more than ten times on a single day, the control device issues an optical warning signal. In this case, a ticket inspector can additionally ask for the ID card of the person checked. In this manner, the passengers are checked in a secure but still efficient manner, since an additional check of the ID documents, in particular a check of the ID card or the passport, is performed only in those cases in which irregularities are noted. The above described memory element may be designed as an integrated memory or as a hard disk. If the memory element is designed as an external memory element, the memory element may in particular be designed as a cloud memory which can be accessed by all ticket inspectors or control devices. The identification data may comprise in particular an ID number of the first terminal device and/or biometrical data. With the above described embodiment, an effective checking method can be provided that is suitable to efficiently detect possible cases of fraud.

According to an advantageous embodiment of the method of the present disclosure, it may be provided that the selection of the first communication channel and the second communication channel is made in an automated manner. For example, a communication channel based on the NFC standard can be selected automatically if an NFC-capable terminal device is detected in the immediate vicinity. Moreover, a communication channel based on the Bluetooth standard can be selected automatically if no NFC-capable terminal devices are detected in the vicinity of the control device, but Bluetooth-capable devices are available. Analogously, the communication between the first terminal device and the control device can use, for example, optical signals and acoustic signals to select correspondingly automatically an optical or an acoustic communication channel. For example, an acoustic or optical communication signal can also be used to select or communicate dynamic addresses for other wireless communication channels (e.g. Bluetooth or WLAN) to be used. Further, for example, one of the terminal devices can generate an acoustic trigger signal signaling the other terminal device that communication is effected via an acoustic signal. The acoustic trigger signal can, for example, comprise a specific spectrum that can be received and evaluated by the respective other terminal device. In this way, an intelligent system is provided that adapts to the individual environmental situation.

According to another embodiment of the method of the present disclosure, it may further be provided that a trainable classifier is used for the automatic selection of the communication channels. The trainable classifier may be in particular an artificial neuronal network. The classifier can be trained using data from the past, which contain, for example, information about which communication channels were used preferably in which situation.

Although, for illustration purposes, the above described method of the present disclosure has been described mainly in the context of a method for checking an electronic railway ticket, it is obvious to a person skilled in the art that the method of the present disclosure is not limited to methods for checking railway tickets, but that the method of the present disclosure is suitable also for securely checking all kinds of electronic tickets. Specifically, the method described can be implemented also to check electronic tickets for concerts, festivals, and sports events.

Further, to achieve the above described object, a control device for checking an electronic ticket, in particular an electronic bus and/or railway ticket is proposed. Here, the electronic ticket is stored on a first mobile terminal device associated with an end consumer. The control device of the present disclosure comprises at least a processor, a memory and a communication module and is configured to

- send a request message to the first terminal device via a first communication channel;
- receive a response message from the first terminal device via a second communication channel, the response message being signed by the first terminal device, and the second communication channel either being identical with the first communication channel or different from the first communication channel;
- verify the signed response message; and
- confirm the authenticity of the response message if the authenticity of the signature could be confirmed by the control device before.

According to an embodiment of the control device of the present disclosure, it may be provided that the communication module comprises an NFC module, a Bluetooth module, a camera and/or a display.

It is obvious to a person skilled in the art that all features described in the context of the method of the present disclosure can also be combined with the control device of the present disclosure.

Overall, the present disclosure provides a multi-stage method, as well as a trust anchor, a trustworthy client application, a ticket issuing system, a control device, and a blocking service. Each of the individual components of the present disclosure contributes to an overall increase in security, whereby a possible misuse of the ticket system provided is made significantly more difficult compared to previously known systems.

BRIEF DESCRIPTION OF THE DRAWINGS

The disclosure will be explained hereunder in detail with reference to embodiments and to the drawings. Specifically, the Figures show.

DETAILED DESCRIPTION

Figure 1:
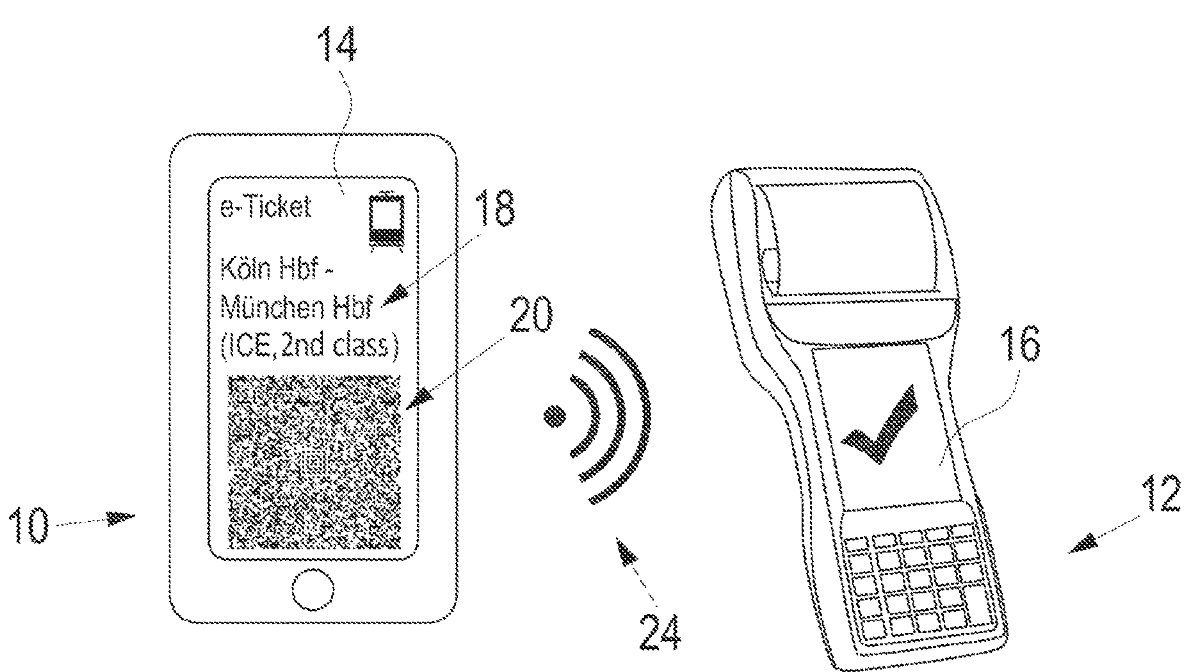
FIG. 1 a schematic illustration of a unidirectional ticket checking method according to the prior art, FIG. 2 a schematic illustration of an embodiment of the bidirectional ticket checking method according to the present disclosure, FIG. 3 another schematic illustration of an embodiment of the method according to the present disclosure, wherein a request message A and a response message B are exchanged between a control device and a mobile terminal device, FIG. 4 another schematic illustration of an embodiment of the method according to the present disclosure, wherein a control device and a mobile terminal device additionally communicate with a server, FIG. 5 another schematic illustration of an embodiment of the method according to the present disclosure, wherein the response message includes a digital certificate, FIG. 6 another schematic illustration of an embodiment of the method according to the present disclosure, wherein the response message includes a time stamp, FIG. 7 another schematic illustration of an embodiment of the method according to the present disclosure, wherein the server determines an identifier associated with the mobile terminal device and generates a digital certificate including the identifier, FIG. 8 a flow diagram for describing an embodiment of the method according to the present disclosure, and FIG. 9 another flow diagram for describing another embodiment of the method according to the present disclosure, wherein the request message comprises a verification message.

FIG. 1 is a schematic illustration of a ticket checking method according to the prior art. In the method illustrated, a unidirectional communication is performed between a first mobile terminal device 10 associated with a consumer and a second terminal device 12 associated with a ticket inspector. In the embodiment illustrated, the first mobile terminal device is designed as a smartphone. In the embodiment illustrated, the second terminal device 12, which in the context of the present disclosure is also referred to as a control device, is designed as a mobile terminal device. The first mobile terminal device 10 and the control device 12 both comprise a display element 14, 16. On the display element 14 of the first terminal device 10, the ticket information 18 is displayed in text form. The ticket data 18 can include in particular information about the route, the booked class (1st or 2nd class) or a seat reservation. In addition, the ticket data are displayed in encrypted form by means of a 2D barcode 20 on the display element 14 of the first terminal device 10. The first terminal device 10 sends the ticket data to the control device 12 via a communication channel 24. Here, the communication channel 24 may be designed as an optical communication channel. As such, the control device 12 can read out the ticket data stored on the first terminal device 10 using a camera or a barcode scanner (both not illustrated in FIG. 1). Thereafter, the ticket data are evaluated and checked. For example, the booked route can be compared with the actual route in order to check, whether the passenger is on the right train. If the ticket data are correct and the passenger has a valid authorization to use the selected means of transport, a confirmation message can be displayed on the display element 16 of the second terminal device 12. Thus, the ticket inspector knows that the passenger has a valid ticket.

Figure 2:
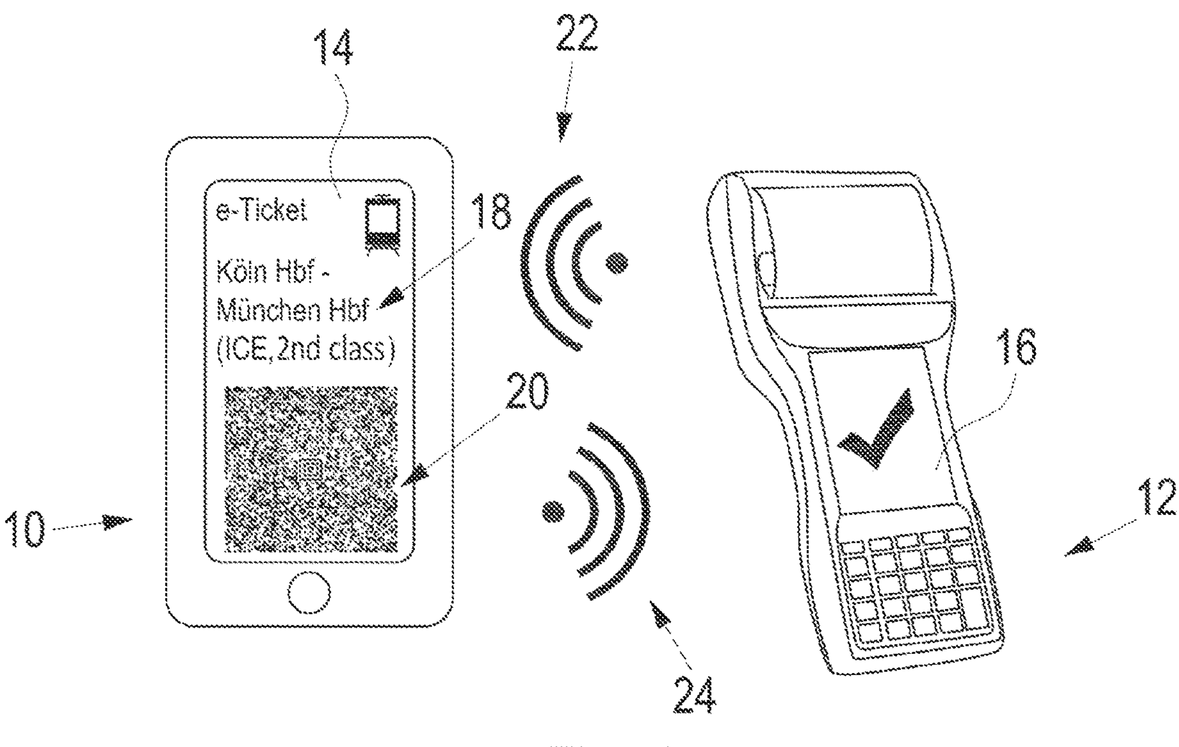

FIG. 2 is a schematic illustration of an embodiment of the method according to the present disclosure, wherein the communication between the control device 12 and the terminal device 10 is bidirectional. Here, the control device 12 can send data to the first terminal device 10 via a first communication channel 22. The first terminal device 10 can send data to the control device 12 via a second communication channel 24. Both communication channels 22, 24 may be identical. For example, both communication channels may be based on the NFC transmission standard. It may also be provided that the first communication channel 22 is based on the NFC transmission standard and the second communication channel 24 is designed as n optical communication channel. In this manner, the request message A can be transmitted via an NFC communication channel, whereas the response message B is represented as a barcode and is read out optically by the control device 12. Due to the bidirectional communication during the ticket check can increase security, as will be shown in the following Figures.

Figures 3, 4:
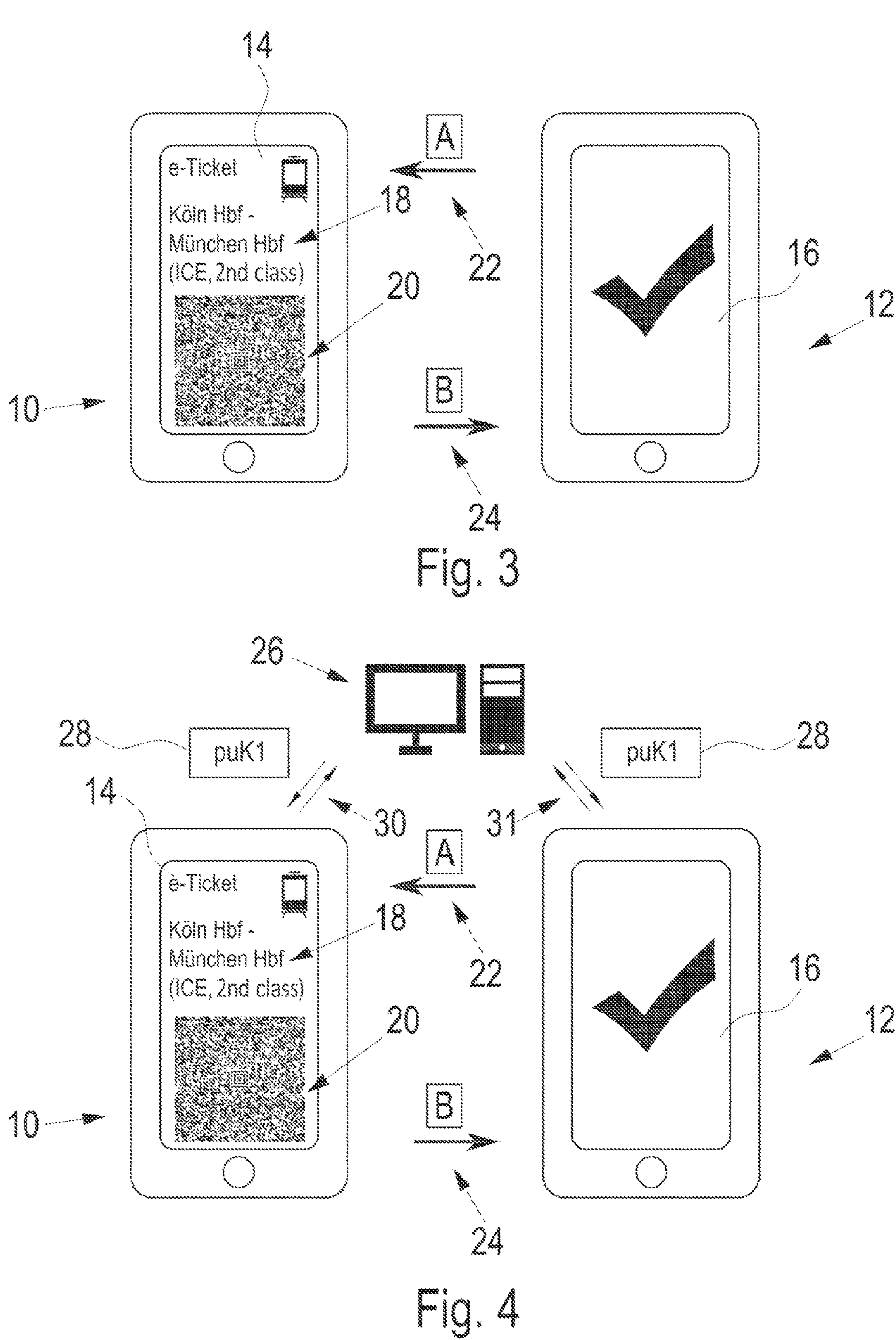

FIG. 3 shows a concrete embodiment of the method according to the present disclosure, wherein the control device 12 and the first mobile terminal device 10 are each designed as a smartphone. According to the method illustrated, the control unit 12 first sends a request message A to the first terminal device 10 via the first communication channel 22. The first terminal device 10 then sends a response message B to the control device via the second communication channel 24. Here, the response message B is signed by the first terminal device 10. The signature of the response message B enables the control device 12 to check whether the response message B was actually generated by the first terminal device 10 or whether the content of the response message B has possibly been manipulated. The signature of the response message B by the first terminal device 10 is performed using a private key of the first terminal device 10. When checking the response message B, a public key of the first terminal device 10 is used to verify the authenticity of the response message B. For example, this public key can be stored in advance on the control device 12. As an alternative, it may be provided that the response message B includes the public key. If the signature of the response message B could be verified by the control device 12 and also the ticket data are correct, a confirmation message can be displayed on the display element 16 of the control device 12.

Furthermore, FIG. 4 illustrates another embodiment of the method according to the present disclosure, in which the first terminal device 10 and the control device 12 communicate with a server 26. In this embodiment, it may be provided in particular that the public key 28 of the first terminal device 10 is stored on a server 26 via a third communication channel 30. This may be done, for example, when a consumer registers with a traffic company. In this case, the server 26 stores all public keys of each consumer. During a ticket check, the control device 12 can access the server 26 and the public key 29 of the first mobile terminal device 10 stored thereon, via a fourth communication channel 31. The control device 12 can then verify the signature of the response message B using the public key 28. If the same could be verified and also the ticket data are correct, a confirmation message can be displayed on the display element 16 of the second terminal device 12.

Figure 5:
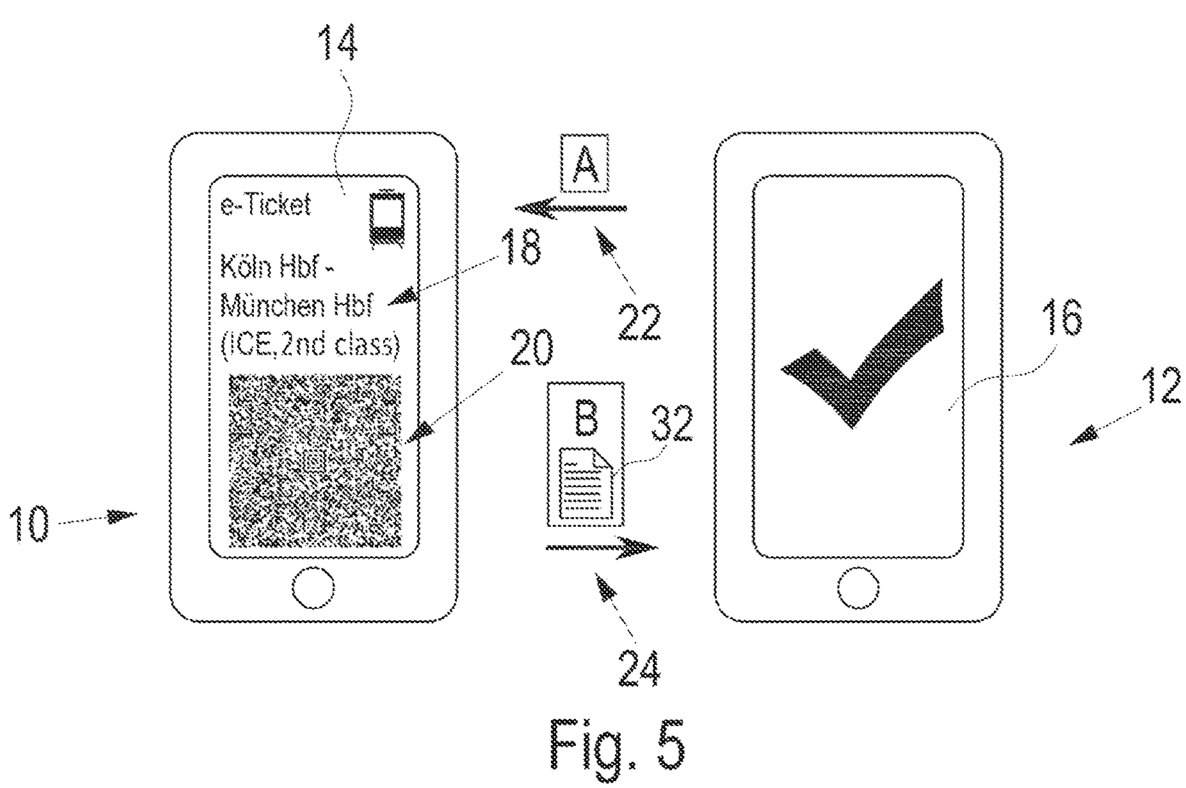

FIG. 5 shows another schematic illustration of an embodiment of the method according to the present disclosure. In this embodiment, the control device 12 transmits the request message A to the first terminal device 10 via the first communication channel 22. Subsequently, the first terminal device 10 transmits a response message B to the control device 12. The response message B contains a digital certificate 32. The digital certificate may be in particular a public key certificate. The digital certificate may contain information about the issuer of the certificate (for example, the name), about the consumer (for example, the name, the date of birth and the address), about the terminal device of the consumer (for example, the ID number of the terminal device) or about the validity period of the certificate (for example 3 months). Further, the digital certificate can contain the public key of the first terminal device 10 or the public key of the issuer of the certificate. In addition, the digital certificate 32 can contain a digital signature of the issuer.

Figure 6:
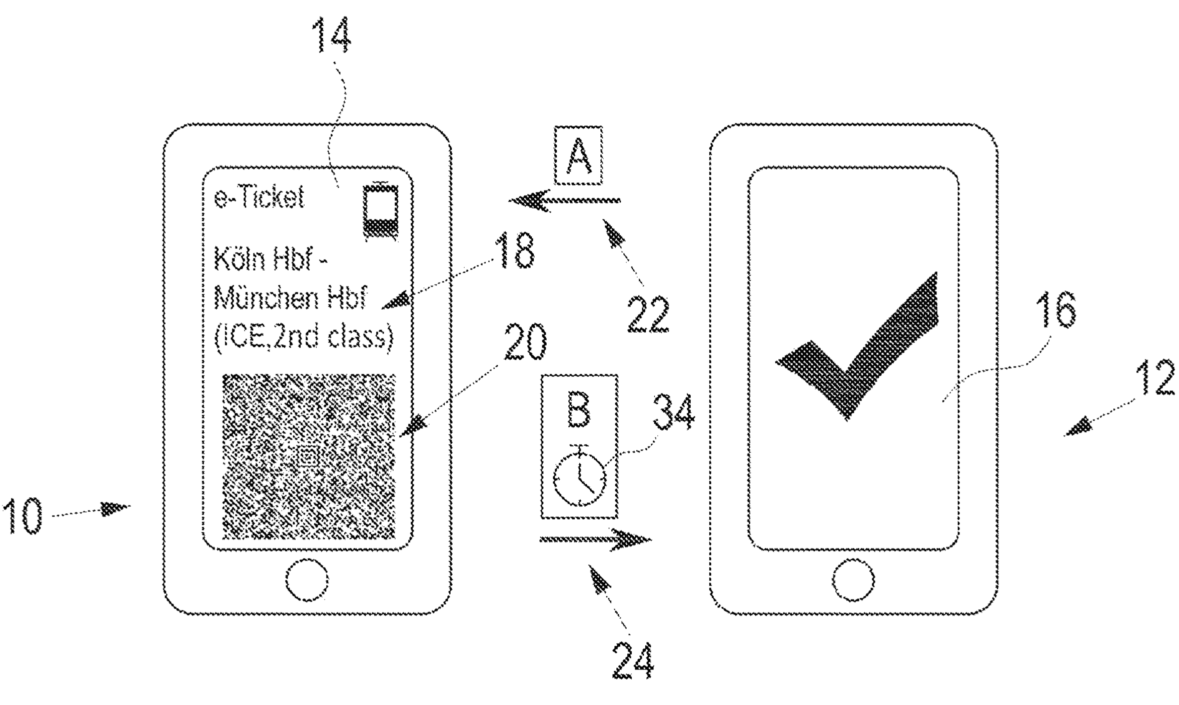

FIG. 6 shows another embodiment of the method according to the present disclosure, wherein, in this embodiment, the response message B comprises a time stamp. The time stamp documents when the response message B was generated. Thus, the control device 12 can, for example, check whether the response B message was generated after the control device 12 has sent a request message A to the first terminal device 10, or whether the response message B has been generated already before the control device 12 has sent the request message A to the terminal device 10. If the response message B has been generated already before the request message A was sent to the first terminal device, it can be assumed that the authenticity of the ticket is at least doubtful. In this case, a corresponding notification can appear on the display element 26 of the second terminal device 12, which recommends that the ticket inspector to manually check the ID data of the passenger in addition to the checking method according to the present disclosure. It is an essential advantage of the method of the present disclosure that this—more time-consuming—check of ID data must be performed only if irregularities are noted during the ticket checking process according to the present disclosure. In the embodiment illustrated in FIG. 6, it may alternatively be provided that the time stamp 34 is compared with the current time and the electronic ticket is classified as invalid if the time stamp is older than a predetermined period (e.g. 1 minute or 5 minutes). Thus, if the response message B was generated two hours ago, this may be seen as an indication that the response message B or the electronic ticket is invalid. In this case, the ID data of the passenger may also be checked.

Figure 7:
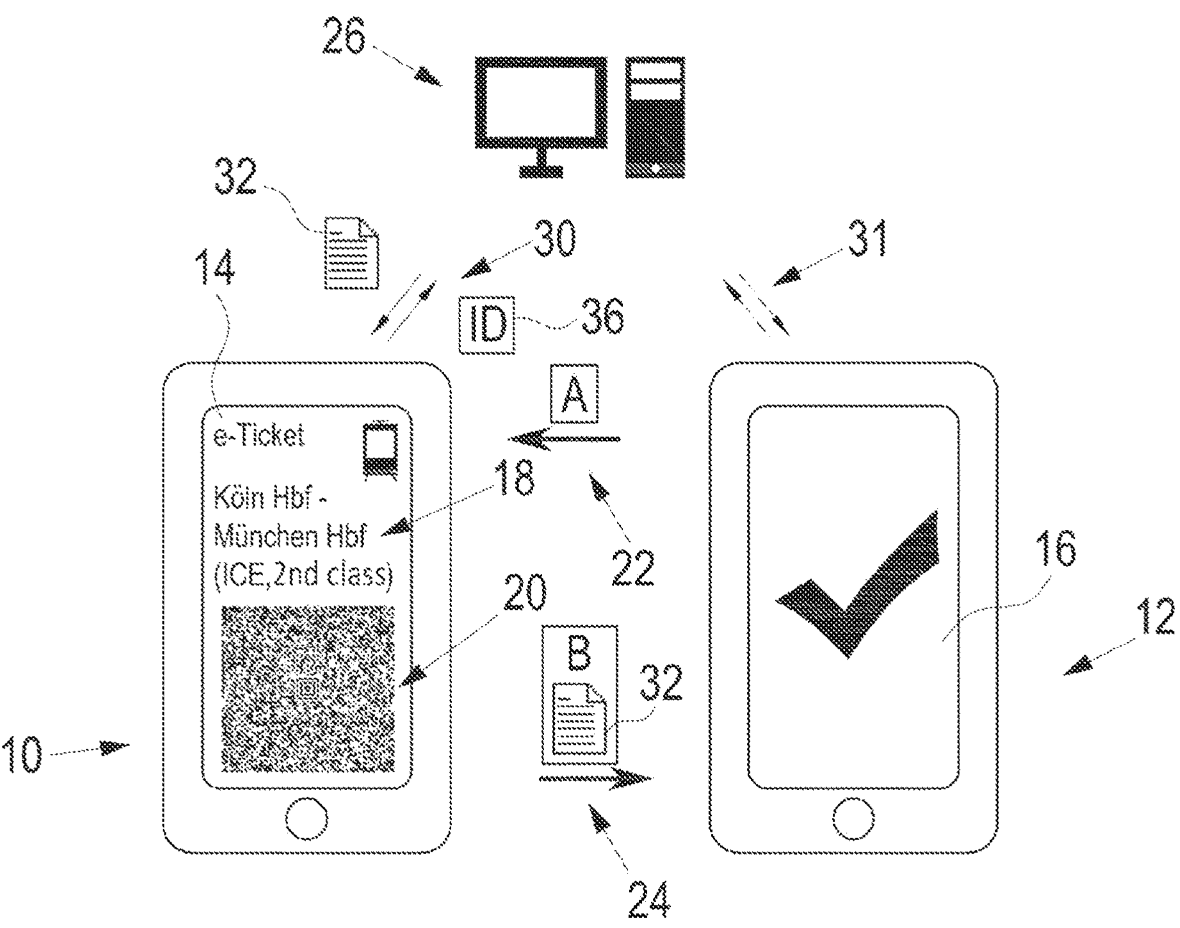

Another preferred embodiment of the method according to the disclosure is illustrated in FIG. 7. In this embodiment, the response message B includes a digital certificate 32. The digital certificate 32 was generated before by the server 26. The digital certificate 32 can be generated, for example, when the user registers with the traffic company. Upon registration, the server 26 determines a unique identifier 36 of the first terminal device 10. This identifier 36 may be, for example a hardware fingerprint. As already explained above, the same can be determined, for example, from the serial number of a hardware component, in particular of a processor or a memory, of the first terminal device 10. In other words, upon registration with the traffic company, the first terminal device 10 can transmit an identifier 36 of the first terminal device 10 to the server 26. As an alternative, the server 26 can read out the identifier of the first terminal device 10. Thereafter, the server 26 generates a digital certificate 32 that contains the identifier 36 of the first terminal device 10. The identifier 36 allows the first terminal device 10 to be unambiguously identified in a later ticket checking process. The digital certificate 32 is provided preferably with a digital signature. The communication between the first terminal device 10 and the server 26 is performed via a third communication channel 30. When the electronic ticket is checked by the control device 12, the response message B and the digital certificate 32 contained therein can be verified. Further, when checking the electronic ticket, the identifier of the first terminal device 10 is read out, as has been done before by the server 26. If the control device 12 reaches the conclusion that the identifier of the first terminal device 10 differs from the identifier stored in the digital certificate 32, this may be considered an indication that the electronic ticket is not valid or that the passenger is not in possession of a valid authorization to use the means of transport. In this case, the display element 16 of the control device 12 may display a notification recommending the ticket inspector to manually check the ID data of the passenger. As an alternative, it may be provided that the ID stored in the digital certificate is compared with the ID stored in the electronic ticket. In this case, a discrepancy between the ID in the digital certificate and the ID stored in the ticket can be seen as an indication that the electronic ticket is not valid or that the passenger is not in possession of a valid authorization to use the means of transport. In principle, basically three different options are possible for checking the ID (comparing the ID stored in the ticket with the ID stored in the digital certificate, comparing the ID stored in the ticket with the ID read out by the first terminal device, comparing the ID stored in the digital certificate with the ID read out by the first terminal device). In the embodiment of the method according to the present disclosure illustrated, it can be provided optionally that the control device 12 communicates with the server 26 via a fourth communication channel 31. This may be used, for example, to retrieve the public key of the server 26 or the first terminal device 10. As an alternative, it may also be provided that the above-mentioned keys are stored in the control device 12 by default.

Figure 8:
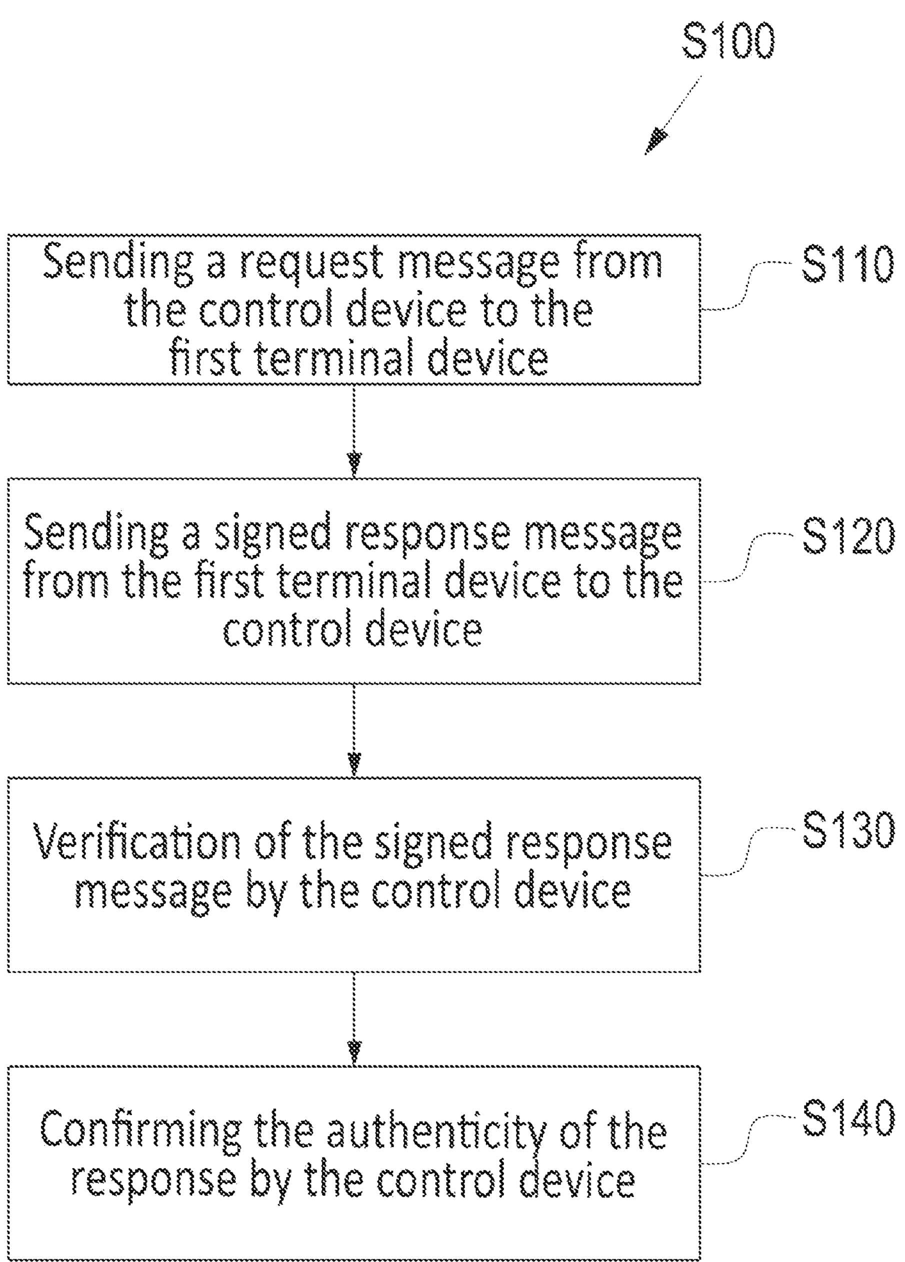

FIG. 8 illustrates the individual steps of an embodiment of the method according to the present disclosure. In response to a request message A of the control device 12 (second terminal device), the first terminal device 10 generates a signed response message B. By checking the signature contained response message B, the control device 12 can verify whether the response message B was actually generated by the first terminal device 10 and is trustworthy, or whether the signature was generated by another device or the content of the response message B was manipulated (principle of checking identity and integrity). For a verification of the signature, the control device requires the public key 28 of the first terminal device 10. This public key 28 may optionally be included in the response message B. As an alternative, it may also be provided that this public key 28 is stored on a server which can be accessed by the control device 12.

Figure 9:
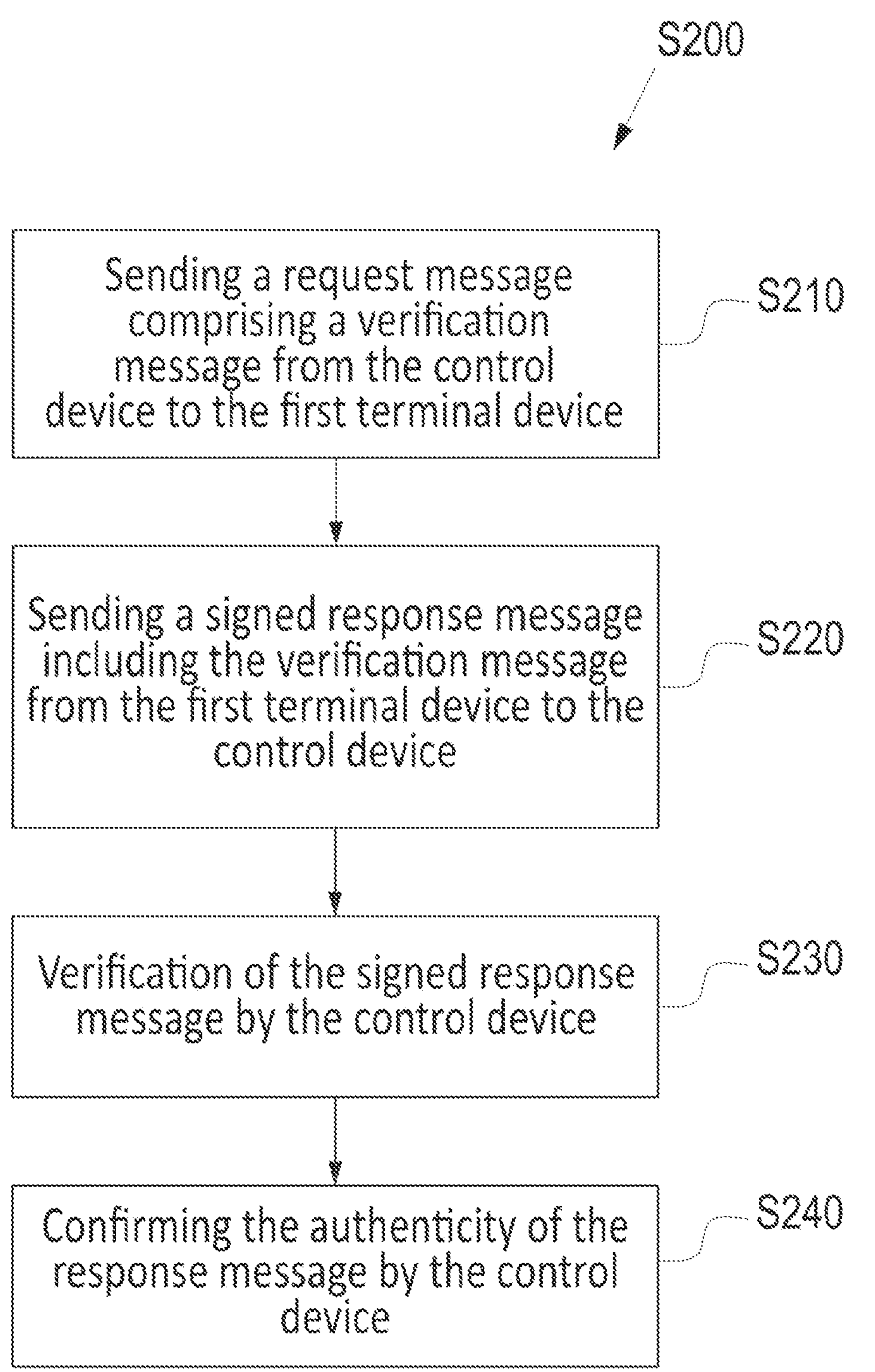

Finally, FIG. 9 illustrates the individual steps of another embodiment of the method according to the present disclosure. In this embodiment, the request message A sent from the control device 12 to the first terminal device 10 contains a verification message. The verification message can be in particular a text message or a string of numbers generated by the control device 12. In particular, it may be a particularly long random number generated by the control device 12. The first terminal device 10 receives this verification message and integrates the same into the response message B which is then signed by the first terminal device 10. Thereafter, the first terminal device 10 sends the signed response message B containing the verification message to the control device 12. Thus, the control device 12 can verify whether the first terminal device 10 has actually received the verification message and, moreover, whether it has a corresponding private key for generating a digital signature. Thereby, it can be virtually excluded that the first terminal device 10 sends a response message B which was generated in advance by a third party, since a third party can not know which verification message will be generated by the control device 12 and be sent to the first terminal device 10. Thus, the embodiment of the method according to the present disclosure shown in FIG. 9 can ensure a particularly high level of security in checking electronic tickets.

The invention claimed is:

1. A method for securely checking an electronic ticket, in which the electronic ticket is stored as data on a first mobile terminal device allocated to an end consumer, and the electronic ticket is checked using a second terminal device allocated to a ticket inspector or to a control system, wherein the method comprises the following steps:

obtaining the electronic ticket by the first terminal device, wherein the electronic ticket comprises a first identifier providing an unambiguous identification associated with the first terminal device, which couples the electronic ticket to the first terminal device, and wherein the electronic ticket comprises a digital signature of the service provider to detect manipulation of the electronic ticket as issued;

sending a request message from the second terminal device to the first terminal device via a first communication channel, the request message comprising a random number of length L;

sending a response message from the first terminal device to the second terminal device via a second communication channel, the response message being signed by the first terminal device, and the second communication channel either being identical with the first communication channel or different from the first communication channel, the response message comprising the electronic ticket, the random number, and a second digital identifier generated by the first terminal device to match the first digital identifier, wherein the random number prevents the second terminal device from verifying a copy of a response message previously generated;

verifying, in response to determining the response message includes a representation of the random number generated by the second terminal device, the authenticity of the signed response message by the second terminal device only when the first identifier obtained from the electronic ticket and the second identifier generated by the first terminal device are identical; and confirming the authenticity of the response message by the second terminal device, if the second terminal device was previously able to verify the authenticity of the signature.

2. The method according to claim 1, wherein the response message includes a digital certificate that originates from an entity classified as trustworthy by the service provider instead of a digital certificate from the service provider that has issued the electronic ticket or form.

3. The method according to claim 1, wherein the response message comprises a time stamp, and wherein the authenticity of the response message is confirmed by the control device only if the age of the time stamp is below a predetermined threshold value.

4. The method according to claim 1, wherein the response message contains a digital certificate in which a security indicator is stored which characterizes the fulfillment of predetermined security requirements by the first terminal device.

5. The method according to claim 4, wherein the security indicator is implemented as a binary security flag, which has a value of 1, if a previous security check of the first terminal device has shown that the first terminal device fulfills the predetermined security requirements; and which has a value of 0, if the previous security check of the first terminal device has shown that the first terminal device does not fulfill the predetermined security requirements.

6. The method according to claim 1, wherein the first terminal device and the second terminal device each comprise a near field communication module, and wherein the first communication channel is based on near field communication.

7. The method according to claim 1, wherein the NFC module of the second terminal device emulates an NFC tag.

8. The method according to claim 1, wherein the second communication channel is based on Near Field Communication, NFC.

9. The method according to claim 1, wherein the response message contains biometrical data of the consumer, in particular data related to a fingerprint, a voice, features of a face or a pattern of an iris.

10. The method according to claim 1, wherein the response message comprises a photographic image of the consumer or a photographic image of the consumer's face.

11. The method according to claim 1, wherein the second terminal comprises a memory element and/or is connected with an external memory element which stores a list of identification data for which the probability of a lack in authenticity exceeds a predetermined probability threshold.

12. The method according to claim 1, wherein the selection of the first communication channel and the second communication channel is automated.

13. The method according to claim 1, wherein the response message includes information about a digital fingerprint of the first terminal device.

14. A control device for checking an electronic ticket, wherein the electronic ticket comprises a first identifier providing an unambiguous identification associated with the first terminal device and couples the electronic ticket to the first terminal device, and wherein the electronic ticket comprises a digital signature of the service provider to detect manipulation of the electronic ticket as issued, wherein the electronic ticket is stored as data on a first mobile terminal device associated with an end consumer, comprising at least a processor, a memory and a communication module, the control device being configured to:

send a request message to the first terminal device via a first communication channel, the request message comprising a random number of length L;

receive a response message from the first terminal device via a second communication channel, the response message being signed by the first terminal device, and the second communication channel either being identical with the first communication channel or different from the first communication channel, the response message comprising the electronic ticket, the random number, and a second digital identifier generated by the first terminal device to match the first digital identifier, wherein the random number prevents the second terminal device from verifying a copy of a response message previously generated;

verify, in response to determining the response message includes a representation of the random number generated by the second terminal device, the authenticity of the signed response message only when the first identifier obtained from the electronic ticket and the second identifier generated by the first terminal device are identical; and confirm the authenticity of the response message if the authenticity of the signature could be confirmed by the control device before.

15. The control device according to claim 14, wherein the communication module comprises an NFC module, a Bluetooth module, a camera and/or a display.

* * * * *